United States Patent
Bothien et al.

(10) Patent No.: US 10,451,283 B2
(45) Date of Patent: Oct. 22, 2019

(54) SEQUENTIAL COMBUSTOR ARRANGEMENT WITH A MIXER

(71) Applicant: ANSALDO ENERGIA SWITZERLAND AG, Baden (CH)

(72) Inventors: Mirko Ruben Bothien, Zürich (CH); Devis Tonon, Turgi (CH); Bruno Schuermans, La Tour de Peilz (CH)

(73) Assignee: Ansaldo Energia Switzerland AG, Baden (CH)

( * ) Notice: Subject to any disclaimer, the term of this patent is extended or adjusted under 35 U.S.C. 154(b) by 592 days.

(21) Appl. No.: 15/007,981

(22) Filed: Jan. 27, 2016

(65) Prior Publication Data

US 2016/0215984 A1 Jul. 28, 2016

(30) Foreign Application Priority Data

Jan. 28, 2015 (EP) .................................. 15152897

(51) Int. Cl.
*F02C 3/20* (2006.01)
*F02C 3/30* (2006.01)
(Continued)

(52) U.S. Cl.
CPC ............... *F23R 3/346* (2013.01); *F02C 3/20* (2013.01); *F02C 3/30* (2013.01); *F23M 20/005* (2015.01);
(Continued)

(58) Field of Classification Search
CPC .. F23R 3/002; F23R 3/16; F23R 3/346; F23R 3/06; F23R 2900/00014;
(Continued)

(56) References Cited

U.S. PATENT DOCUMENTS

| 5,593,302 A * | 1/1997 | Althaus ................... F23M 9/00 431/350 |
| 5,626,017 A * | 5/1997 | Sattelmayer ............ F23C 6/042 60/723 |

(Continued)

FOREIGN PATENT DOCUMENTS

| DE | 103 12 971 A1 | 12/2004 | |
| EP | 0990851 A1 * | 4/2000 | .............. F23R 3/002 |

(Continued)

OTHER PUBLICATIONS

Lefebvre, Arthur H., and Dilip R. Ballal. Gas Turbine Combustion: Alternative Fuels and Emissions, Third Edition. vol. 3rd ed, CRC Press, 2010, pp. 114-117. EBSCOhost, search.ebscohost.com/login. aspx?direct=true&db=edsebk&AN=934993&site=eds-live&scope=site. (Year: 2010).*

(Continued)

*Primary Examiner* — Alain Chau
(74) *Attorney, Agent, or Firm* — Buchanan Ingersoll & Rooney PC

(57) ABSTRACT

A sequential combustor arrangement and method are disclosed which can include a first burner, a first combustion chamber, a mixer for admixing a dilution gas to the hot gases leaving the first combustion chamber during operation, a second burner, and a second combustion chamber arranged sequentially in a fluid flow connection. The mixer can include at least one injection opening in the mixer wall for admixing the dilution gas to cool the hot flue gases leaving the first combustion chamber. Further, the mixer can include a damper with a damper volume and a neck connecting the damper volume to the mixer, for modulating and damping pressure pulsations inside the mixer.

18 Claims, 4 Drawing Sheets

(51) Int. Cl.
*F23R 3/06* (2006.01)
*F23R 3/16* (2006.01)
*F23R 3/34* (2006.01)
*F23M 20/00* (2014.01)

(52) U.S. Cl.
CPC .............. *F23R 3/06* (2013.01); *F23R 3/16* (2013.01); *F05D 2270/14* (2013.01); *F23R 2900/00014* (2013.01); *F23R 2900/03341* (2013.01)

(58) Field of Classification Search
CPC ............. F23R 2900/03341; F23R 3/34; F23M 20/005; F05D 2260/963; F05D 2270/14; F02C 3/14; F02C 3/20; F02C 3/30
See application file for complete search history.

(56) References Cited

U.S. PATENT DOCUMENTS

| | | | |
|---|---|---|---|
| 6,351,947 B1 * | 3/2002 | Keller | F23R 3/002 60/725 |
| 6,530,221 B1 | 3/2003 | Sattinger et al. | |
| 7,448,215 B2 | 11/2008 | MacQuisten et al. | |
| 8,931,589 B2 | 1/2015 | Bothien et al. | |
| 8,966,903 B2 | 3/2015 | Bobba et al. | |
| 8,991,185 B2 | 3/2015 | Huber et al. | |
| 9,970,659 B2 * | 5/2018 | Schuermans | F23R 3/002 |
| 2003/0233831 A1 | 12/2003 | Suenaga et al. | |
| 2005/0166596 A1 * | 8/2005 | Sattinger | F01D 25/30 60/772 |
| 2005/0229581 A1 * | 10/2005 | Bellucci | F23D 11/402 60/39.17 |
| 2006/0123791 A1 | 6/2006 | MacQuisten et al. | |
| 2007/0102235 A1 * | 5/2007 | Tobik | F01N 1/02 181/250 |
| 2007/0256416 A1 * | 11/2007 | Dodo | F23R 3/14 60/737 |
| 2011/0220433 A1 | 9/2011 | Nakamura et al. | |
| 2011/0232288 A1 * | 9/2011 | Bizouard | F02C 3/14 60/722 |
| 2011/0265484 A1 | 11/2011 | Huber et al. | |
| 2011/0308654 A1 | 12/2011 | Bothien et al. | |
| 2013/0042619 A1 | 2/2013 | Bobba et al. | |
| 2013/0074471 A1 | 3/2013 | Khan et al. | |
| 2014/0109591 A1 | 4/2014 | Bothien et al. | |
| 2015/0047357 A1 * | 2/2015 | Schuermans | F23R 3/002 60/725 |
| 2015/0059345 A1 * | 3/2015 | Hellat | F23R 3/002 60/725 |
| 2015/0159870 A1 | 6/2015 | Huber et al. | |
| 2015/0198334 A1 * | 7/2015 | Duesing | F23R 3/04 60/772 |
| 2015/0226122 A1 | 8/2015 | Duesing et al. | |

FOREIGN PATENT DOCUMENTS

| | | | | |
|---|---|---|---|---|
| EP | 1 669 670 A1 | 6/2006 | | |
| EP | 2 385 303 A1 | 11/2011 | | |
| EP | 2 397 760 A1 | 12/2011 | | |
| EP | 2 559 944 A2 | 2/2013 | | |
| EP | 2 573 467 A2 | 3/2013 | | |
| EP | 2642204 A1 * | 9/2013 | ............. | F23R 3/002 |
| EP | 2 725 300 A1 | 4/2014 | | |
| WO | WO-2014029512 A2 * | 2/2014 | ................ | F02C 7/22 |

OTHER PUBLICATIONS

Extended European Search Report dated Jul. 24, 2015, by the European Patent Office in corresponding European Patent Application No. 15152897.3-1602. (9 pages).

* cited by examiner

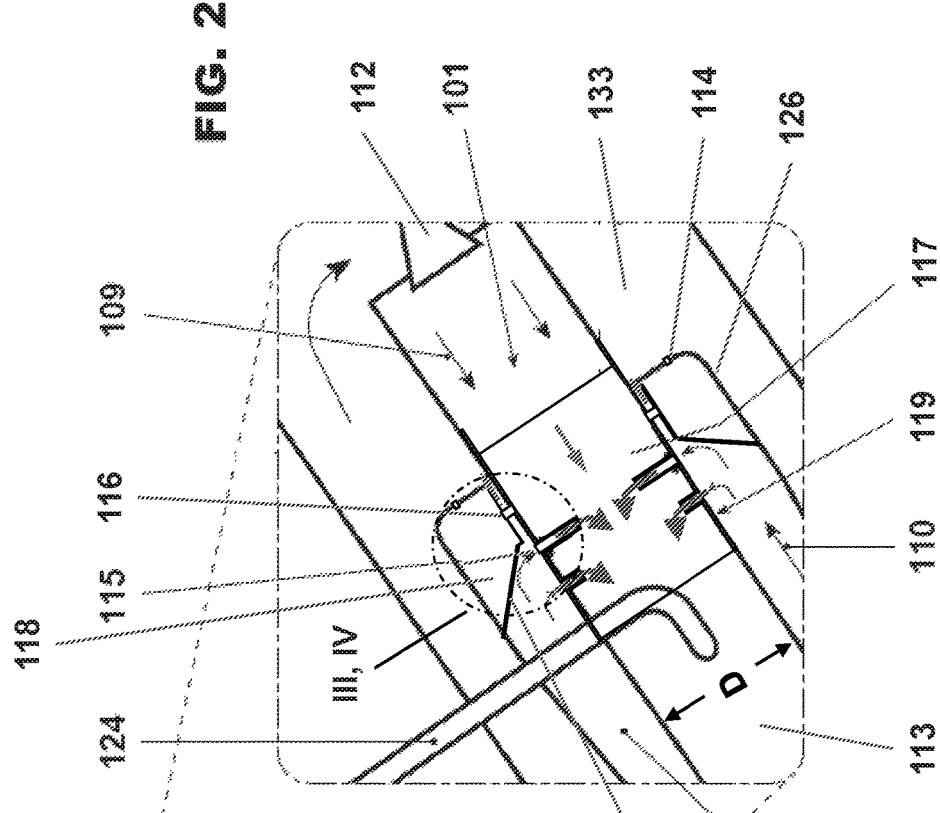
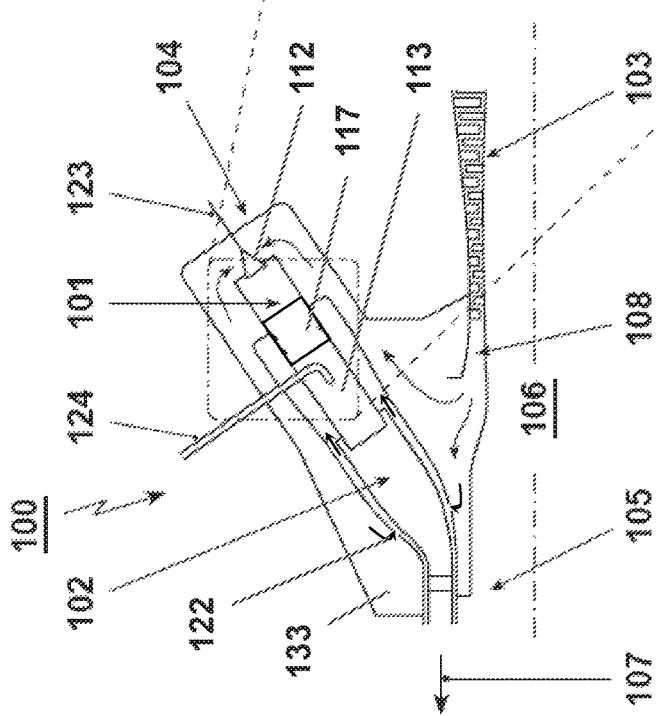

SEQUENTIAL COMBUSTOR ARRANGEMENT WITH A MIXER

TECHNICAL FIELD

The invention refers to a sequential combustor arrangement for a gas turbine with admixing dilution gas into the combustor arrangement and damping pulsations. The invention additionally refers to a method for operating a gas turbine with admixing dilution gas into a combustor arrangement.

BACKGROUND OF THE INVENTION

Due to increased power generation by unsteady renewable sources like wind or solar existing gas turbine based power plants are increasingly used to balance power demand and to stabilize the grid. Thus improved operational flexibility is required. This implies that gas turbines are often operated at lower load than the base load design point, i.e. at lower combustor inlet and firing temperatures.

At the same time, emission limit values and overall emission permits are becoming more stringent, so that it is required to operate at lower emission values, to keep low emissions also at part load operation and during transients, as these also count for cumulative emission limits.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements.

To further reduce emissions and operational flexibility sequential combustion has been suggested in DE 103 12 971 A1. Depending on the operating conditions, in particular on the hot gas temperature of a first combustion chamber it can be necessary to cool the hot gases before they are admitted to a second burner (also called sequential burner). This cooling can be advantageous to allow fuel injection and premixing of the injected fuel with the hot flue gases of the first combustor in the second burner.

Conventional cooling methods either require heat exchanger structures which lead to high pressure drops in the main hog gas flow or suggest injection of a cooling medium from the side walls. For injection of a cooling medium from the side walls a high pressure drop is required which is detrimental to the efficiency of a gas turbine operated with such a combustor arrangement, and can have a negative influence on the combustion stability and pulsations. Combustor pulsations are known to have a detrimental effect on the performance and life time of gas turbine combustors.

SUMMARY OF THE INVENTION

The object of the present invention is to propose a cooling and mixing enhancement in connection with a mixing section with a damper for a sequential combustor arrangement. In addition to the known problems related to combustion pulsations the pulsations can influence the operation of a mixer admixing cool gas to the hot gas leaving a combustion chamber. In particular low frequency pulsations with high pressure amplitudes can influence the mass flow of dilution gas entering the mixer. Especially a standing wave can lead to flow variation of the admixed dilution gas and therefore to rapid changes in the temperature level and temperature profile of the hot gas leaving the mixer, which in turn can trigger pulsations in the sequential combustion arrangement.

An object of the disclosure is to present a combustion arrangement in which the pulsations are modulated, respectively damped such that their detrimental effect on the mixer performance are reduced or diminished.

A sequential combustor arrangement according to the disclosure comprises a first burner, a first combustion chamber, a mixer for admixing a dilution gas to the hot gases leaving the first combustion chamber during operation, a second burner, and a second combustion chamber arranged sequentially in a fluid flow connection. The mixer is adapted to guide combustion gases in a hot gas flow path extending between the first combustion chamber and the second burner. The combustor arrangement further comprises at least injection opening for admixing the dilution gas to cool the hot flue gases leaving the first combustion chamber. In order to shift a pulsation node of a low frequency pulsation towards the injection openings the mixer has a damper wall which encloses a damper for damping pressure pulsations inside the mixer. The damper comprises a damper volume and a neck connecting the damper volume to hot gas flow inside the mixer.

The injection openings can be simple holes or nozzles in the side walls of the mixer. The injection openings can for example also comprises a plurality of injection tubes (also called injection pipes), which are pointing inwards from the side walls of the mixer for admixing the dilution gas to cool the hot flue gases leaving the first combustion chamber to provide appropriate inlet conditions to the second burner. The injection openings can be are arranged circumferentially distributed along the side wall of the mixer. A duct wall at least partly encloses the side wall of the mixer thereby delimiting a connecting duct for cooling the mixer side wall and for feeding dilution gas to the injection openings.

The mixer concept in connection with the features of the invention is used to create the suitable sequential burner inlet profile by mixing the dilution and the cooling air with the hot gas flows from the first combustor. Generally, the mixer wall is cooled with a convective cooling technique and/or an effusion cooling technique and/or an impingement cooling technique.

Ancillary, effusion cooling techniques are applied on the mixer because of not only good cooling of the mixer wall, but also provide mixing of the cooling air with the main hot gas flow to deliver suitable inlet hot gas profile for reheat combustion.

Accordingly, the focused object of the present invention is to propose a pulsation resistant sequential combustor arrangement with a mixing section for dilution gas admixing between the first combustion chamber and the second burner. The dilution gas is admixed in the mixing section to provide proper inlet flow conditions for the second burner, and a damper is arranged to shift a node of a pulsation wave towards the injection openings for admitting the dilution gas into the hot gas flow such that variations in the static back pressure at the injection openings are reduced or diminished. As a result the dilution gas flow remains close to constant over time such that the hot gases can be cooled to a predetermined temperature profile.

Additional Findings Related to the Invention:

High local inlet temperatures may result in high emissions (in particular NOx, CO, and unburned hydrocarbons) and/or flashback in the second burner. Flashback and NOx are induced by the reduced self-ignition time for the injected fuel due to a high inlet gas temperature or high oxygen concentration, which causes earlier ignition (leading to flashback) or reduced time for fuel air mixing resulting in local hot spots during combustion and consequently increases NOx emission. Low temperature regions can cause CO emissions, due to the increased self-ignition time. This can reduce the time for CO to $CO_2$ burnout, and a reduced local flame temperature, which can further slowdown the CO to $CO_2$ burnout. Finally local hot spots may lead to overheating of certain parts downstream of the mixer.

Further important requirements from the aerodynamic point of view are minimized pressure loss in the hot gas path and the dilution gas supply. Both can impact the performance of a gas turbine operating with such a sequential combustor arrangement. The dilution gas pressure loss can be reduced if the back pressure in the hot gas flow path is practically constant.

Typically, but without any limitation, admixing of dilution gas with a pressure drop of 0.2% to 1% of the total pressure of the dilution gas pressure before admixing is possible if no pulsations disturb the flow at the injection openings.

In one embodiment to assure that a damper can have an immediate positive effect on the pulsations near the injection opening the distance in flow direction of the hot gas flow between an injection opening and the opening of the neck to the hot gas flow path in the mixer wall is less than three times the hydraulic diameter of the mixer's hot gas flow path at the opening of the neck (the hydraulic diameter can be defined as four times the cross sectional area divided by the wetted perimeter). Preferably the distance between an injection opening and the opening of the neck to the hot gas flow path in the mixer wall is less than the hydraulic diameter of the mixer at the opening of the neck. Alternatively or in combination the distance in flow direction of the hot gas flow between an injection opening and the opening of the neck to the hot gas flow path in the mixer wall can be determined in relation to the wave length of a predominate pulsation in the mixer. The distance in flow direction of the hot gas flow between an injection opening and the opening of the neck can for example be less than one sixth the wave length of such a predominate pulsation in the mixer. The distance in flow direction of the hot gas flow between an injection opening and the opening of the neck has to be small relative to the wave length of the pulsation because the damper moves the pulsation wave towards the damper's neck. Therefore the injection opening shall be close to the damper neck to benefit from the low pressure amplitude at the neck.

In addition to shifting the node of the pulsation the damper can reduce the pulsation level, as this is the typical function of a damper.

According to a further embodiment the mixer is at least partly enclosed by the damper. For example the wall of the mixer can be enclosed by a damper wall forming a cooling duct for cooling the inlet section of the mixer between the upstream end of the mixer and a first injection openings (in flow direction of the hot gas) for admixing the dilution gas.

In a further embodiment the neck of the damper is extending from the damper wall through the cooling duct to the mixer wall.

According to another embodiment a duct wall at least partly encloses the mixer wall delimiting a connecting duct for feeding dilution gas to the injection openings. The duct for feeding dilution can for example be arranged next to the damper towards the downstream end of the mixer (in hot gas flow direction).

According to a further embodiment a purge gas feed is provided to supply cooling air to the damper volume. The purge gas feed can for example be a hole or nozzle in the damper wall separating the damper volume from a compressor plenum of a gas turbine. The purge air prevents hot gas ingestion through the neck into the damper volume.

According to yet a further embodiment the neck of the damper opens to the hot gas flow between injection openings or upstream of the injection openings in hot gas flow direction. It can also open to the hot gas flow downstream of the injection openings.

The damper comprises a damper wall defining the damper volume inside the damper wall, and a neck. The neck comprises a neck wall defining a neck volume inside the neck wall, wherein the neck is associated with the damper volume for fluid communication between the damper volume and the hot gas flow in the mixer. The mixer wall is exposed to high temperatures hot gas and vibration due to combustion pulsation which result in thermal expansion and mechanical movement of the mixer wall. These mechanical movements can differ from the movements, thermal and mechanical loads to which the damper wall is exposed. These differences can lead to stresses and reduce the life time of the combustor arrangement.

According to one embodiment of the sequential combustion arrangement the damper further comprises a gap between the neck wall and the damper wall to avoid stresses at the interface between the mixer wall and the neck. This gap allows for independent thermal expansion and movement of the damper neck together with the combustion chamber wall independently of the damper structure.

The gap and the neck can for example be coaxial. In a further embodiment, the full circumference of the neck is surrounded by the gap.

Another embodiment the combustor arrangement comprises a gap between the neck wall and the damper wall. This allows for independent thermal expansion and movement of the damper neck together with damper structure independently of the mixer wall.

The gap can be purged by cooling air. For example the gap can be purged by cooling gas flowing through the cooing duct which is extending between the mixer wall and the damper wall.

According to a further embodiment the ratio of the pressure loss coefficient of the dilution gas feed to the pressure loss of the dilution gas injection opening is smaller than the ratio of the pressure loss coefficient of purge gas feed to the pressure loss coefficient of the neck. For two elements which are arranged in series, like the dilution gas feed and the dilution gas injection opening or the purge gas feed and the neck the pressure loss is proportional to the pressure loss coefficient. Thus the pressure loss over the injection opening is larger than the pressure loss over the neck. The ratio of the pressure loss coefficients can be for example greater than 5 or greater than 10 and even up to 100 or more. The large ratio leads to a hardening of the dilution gas injection relative to the neck. The small pressure loss in the neck will not reduce the damping performance while the larger pressure drop in the injection opening will reduce the impact of pressure fluctuations in the hot gas flow on the dilution gas flow.

According to yet another embodiment the flow capacity of the dilution gas flow path from a compressor plenum to the hot gas flow path in the mixer is at least two times larger than the flow capacity of the purge air flow path from the compressor plenum to the hot gas flow path in the mixer. Typically the flow capacity of the dilution gas flow path is at least one order of magnitude larger than the flow capacity of the purge air flow path to reduce the influence of the damper on the temperature distribution of the hot gases leaving the mixer. Thereby the functionality of the damper and the injection openings can be separated.

The mixer wall of the sequential combustor arrangement can be at least partly effusion cooled. Further, at least part of the inner surface of the side wall of the mixer can be coated with TBC to reduce the cooling requirements of the wall, and to thereby avoid cool peripheral regions in the hot gas flow leaving the mixer.

Besides, the sequential combustor arrangement a gas turbine comprising such a sequential combustor arrangement is subject of the present disclosure. Such a gas turbine comprises at least a compressor, a sequential combustor arrangement with a first burner, a first combustion chamber, a mixing device for admixing a dilution gas to the hot gases leaving the first combustion chamber during operation, a second burner, and a second combustion chamber arranged sequentially in fluid flow connection, wherein the mixer is adapted to guide combustion gases in a hot gas flow path extending between the first combustion chamber and the second burner, and at least one turbine. The mixer comprises at least one injection opening for admixing the dilution gas to cool the hot flue gases leaving the first combustion chamber, and a damper for damping pressure pulsations inside the mixer. The damper comprises a damper wall which encloses a damper volume and a neck connecting the damper volume to the mixer. The damper is designed to shift to dampen a combustor pulsation and to thereby shift a node of the pressure pulsation towards the dilution gas injection opening.

The gas turbine can comprise any of the above described sequential combustor arrangements.

Besides, the gas turbine a method for operating such a gas turbine is subject of the present disclosure. Dilution gas can be admixed to the hot gases in the mixer such that the hot gases are cooled. To mitigate the influence of combustion pulsations a node of pulsation wave inside the mixer is shifted towards the injection openings by the damper. The node can best be shifted by a damper tuned to the frequency of the pulsation.

According to an embodiment of the method for operating a gas turbine the average velocity of the dilution gas in the injection opening is at least twice as high as a time averaged average flow velocity in the neck. The average velocity of the dilution gas in the injection opening can be an order of magnitude or several orders of magnitude higher than the time averaged average flow velocity in the neck. The time average is taken over a length of time which is at least in the order of the duration of one pulsation period of the predominant pulsation frequency. The higher the ratio the smaller the influence of the pulsation on the dilution gas injection becomes.

According to a further embodiment of the method the pressure drop over purge gas feed is at least twice as big as the pressure drop over the neck. The ratio of the pressure drop over neck to pressure drop over the purge gas feed can be much smaller than 1 to 3 or even smaller than 1 to 5. During operation the pressure drop over the purge gas feed can be an order of magnitude bigger than the pressure drop over the neck or even bigger.

The first combustion chamber and the second combustion chamber may be arranged in a can-can-combustor architecture, i.e. the first combustion chamber and second combustion chamber are can-combustion chambers.

The first combustion chamber and the second combustion chamber may be arranged in a can-annular-combustor architecture, i.e. the first combustion chamber is arranged as an annular combustion chamber and second combustion chamber is arranged as can-combustion chamber.

The first combustion chamber and the second combustion chamber may be arranged in an annular-can-combustor architecture, i.e. the first combustion chamber is arranged as can combustion chamber and second combustion chamber is arranged as an annular combustion chamber.

The first combustion chamber and the second combustion chamber may be arranged in an annular-annular-combustor architecture, i.e. the first combustion chamber and second combustion chamber are annular combustion chambers.

The mixer itself can have a can or annular structure independently of the combustion chamber architecture. The mixer can for example have a can architecture if arranged downstream of a first can combustion chamber, or can for example have an annular architecture if arranged downstream of a first annular combustion chamber.

BRIEF DESCRIPTION OF THE FIGURES

The disclosure, its nature as well as its advantages, shall be described in more detail below with the aid of the accompanying figures. Referring to the figures:

FIG. 1 shows a generic gas turbine with a sequential combustion arrangement with a damped mixer for admixing dilution gas;

FIG. 2 shows a sequential combustor arrangement with a mixer with an injection openings and a damper;

DETAILED DESCRIPTION OF EXEMPLARY EMBODIMENTS

Figure 3:
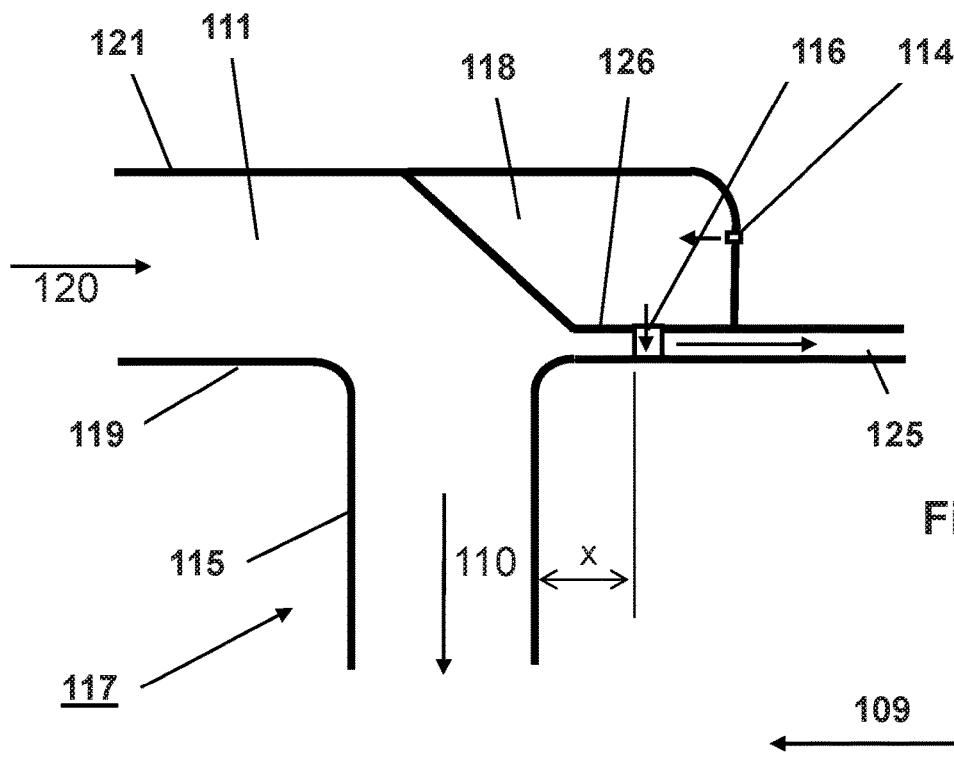
FIG. 3 shows an example of the mixer with a connecting duct for feeding dilution gas through an injection tube into the hot gas flow downstream of a damper neck in more detail.

FIG. 1 shows a gas turbine 100 with a sequential combustor arrangement 104 according to the disclosure. It comprises a compressor 103, a sequential combustor arrangement 104, and a turbine 105. The sequential combustor arrangement 104 comprises a first burner 112, a first combustion chamber 101, and a mixer 117 for admixing a dilution gas to the hot gases leaving the first combustion chamber 101 during operation (see FIG. 2). Downstream of the mixer 117 the sequential combustor arrangement 104 further comprises a second burner 113, and a second combustion chamber 102. The first burner 112, first combustion chamber 101, mixer 117, second burner 113 and second combustion chamber 102 are arranged sequentially in a fluid flow connection. Fuel can be introduced into the first burner 112 via a first fuel injection 123, mixed with compressed air 108 which is compressed in the compressor 103, and combusted in the first combustion chamber 101. Dilution gas which is supplied from a compressor plenum 133 via a dilution gas feed 122 is admixed in the subsequent mixer 117. Additional fuel can be introduced into the second burner via a second fuel injection 124, mixed with hot gases leaving the mixer 117, and combusted in the second combustion chamber 102. The hot gases leaving the second combustion chamber 102 are expanded in the subsequent turbine 105, performing work. The turbine 105 and compressor 103 are arranged on a shaft 106.

The remaining heat of the exhaust gas 107 leaving the turbine 105 can be further used in a heat recovery steam generator or boiler (not shown) for steam generation.

In the example shown here compressor exit gas is admixed as dilution gas. Typically compressor exit gas is compressed ambient air. For gas turbines with flue gas recirculation (not shown) the compressor exit gas is a mixture of ambient air and recirculated flue gas. Air is used as representing any gas comprising oxygen.

Typically, the gas turbine system includes a generator (not shown) which is coupled to a shaft 106 of the gas turbine 100.

FIG. 2 shows an exemplary embodiment of a mixer 117 as an enlarged section of the FIG. 1. In this example compressed gas from the compressor plenum 133 (see FIG. 1, compressed gas 108 downstream of compressor 103) is supplied via a dilution gas feed 122 (only shown in FIG. 1) and is guided along the combustor liner in a connection duct 111 as dilution gas 110. From the connection duct 111 the dilution gas 110 is injected into the mixer 117 via an injection tube 115. For cooling the mixer wall 119 and for feeding the injection tubes 115 with dilution gas 110 a duct wall 121 is arranged parallel to the mixer wall 119.

A damper is arranged near the dilution gas injection openings 115, 115a, which are in this example shown as injection tubes 115. The damper comprises a damper wall 126 which defines a damper volume 118 and a damper neck 116. The neck 116 is associated with the damper volume 118 for fluid communication between the damper volume 118 and the hot gas flow 109.

The mixer can for example have an annular cross section, rectangular or trapezoidal cross section or circular. For the example of a cylindrical mixer 117 with a circular cross section the diameter is equal to the hydraulic diameter D.

FIG. 3 shows the dilution gas injection and damper of region III, IV from FIG. 2 in more detail. Upstream (in hotgas flow direction) the side wall 119 of the mixer 117 is enclosed by a damper wall 126 forming an annular cooling duct 125 for cooling the inlet section of the mixer 117. The damper volume 118 is thus separated from the hot gas flow 109. Purge air is feed to the damper via a purge gas feed 114 into the damper volume 118 and purges the neck 116. The neck 116 is offset by a distance to dilution injection x. The Distance to dilution injection x shall be kept small relative to the diameter of the mixer to enable the damper to shift a node of the pulsation towards the exit opening of the injection tube 115.

Figure 4:
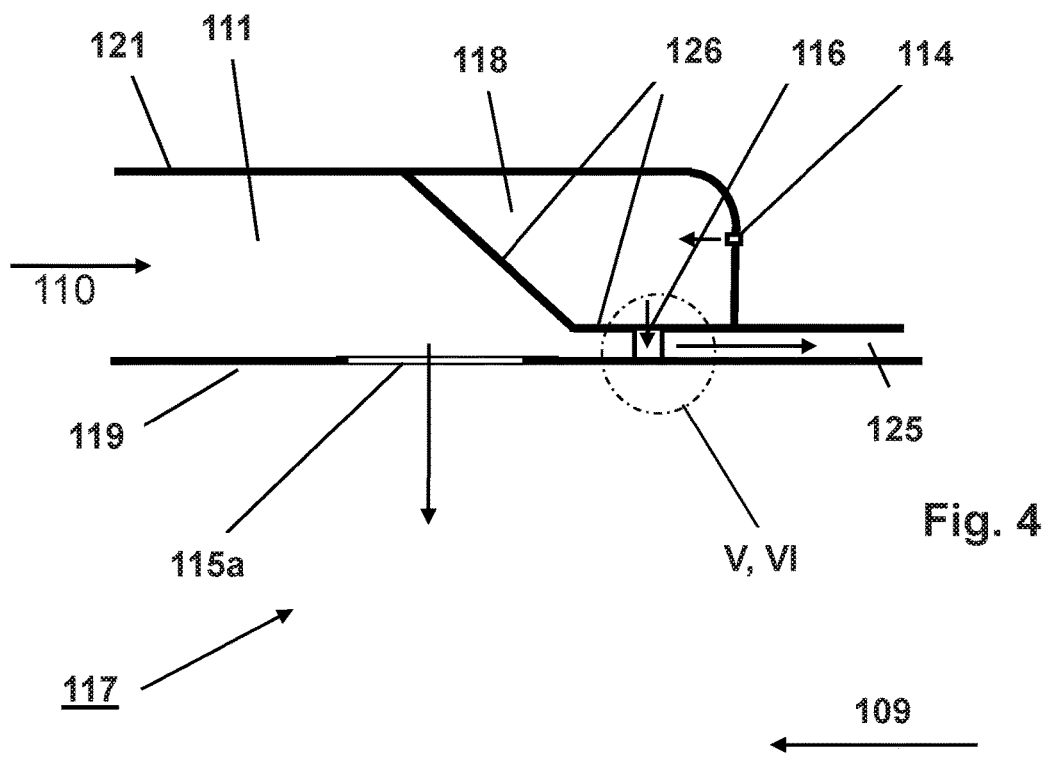
FIG. 4 shows another example of the mixer with a connecting duct for feeding dilution gas through an injection nozzle into the hot gas flow downstream of a damper neck in more detail.

FIG. 4 is based on FIG. 3. Instead of injection tube 115 an injection nozzle 115 is shown in FIG. 4.

Figure 5:
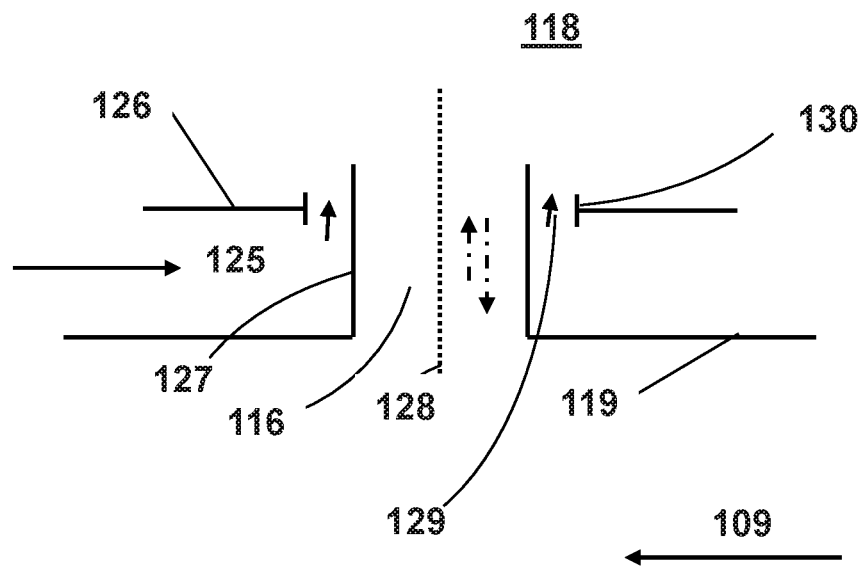
FIG. 5 shows a close up of the cross section of an example for the damper connection to the mixer wall.

FIG. 5 shows an example of the neck 116 which connects the damper volume 118 to the hot gas flow 109. The neck wall 127 defines a neck volume. In this example the neck 116 is attached to the mixer wall 119 and extends through the cooling duct 125 towards the damper volume 118. In addition the damper comprises a gap 129 between the neck wall 127 and the damper wall 126. Optionally, a flange 130 is provided at the opening of the damper wall 126 to delineate the gap 129. A cylindrical neck 116 is indicated by the neck axis 128. In this case an annular gap 129 encircles the neck wall 127. The gap can be purged by cooling air 125.

Figure 6:
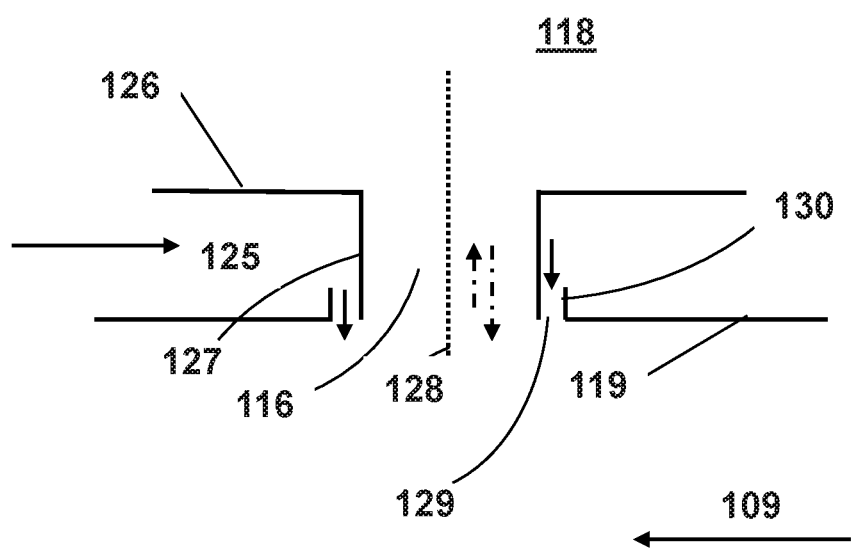
FIG. 6 shows a close up of the cross section of another example for the damper connection to the mixer wall.

FIG. 6 is based on FIG. 5. In this example the neck wall 127 is attached to the damper wall 126 and a gap 129 is provided between the neck wall 127 and the mixer wall 119. A flange 130 is provided at the opening of the mixer wall 119 to delineate the gap 129. The gap can be purged by cooling air 125.

Figure 7:
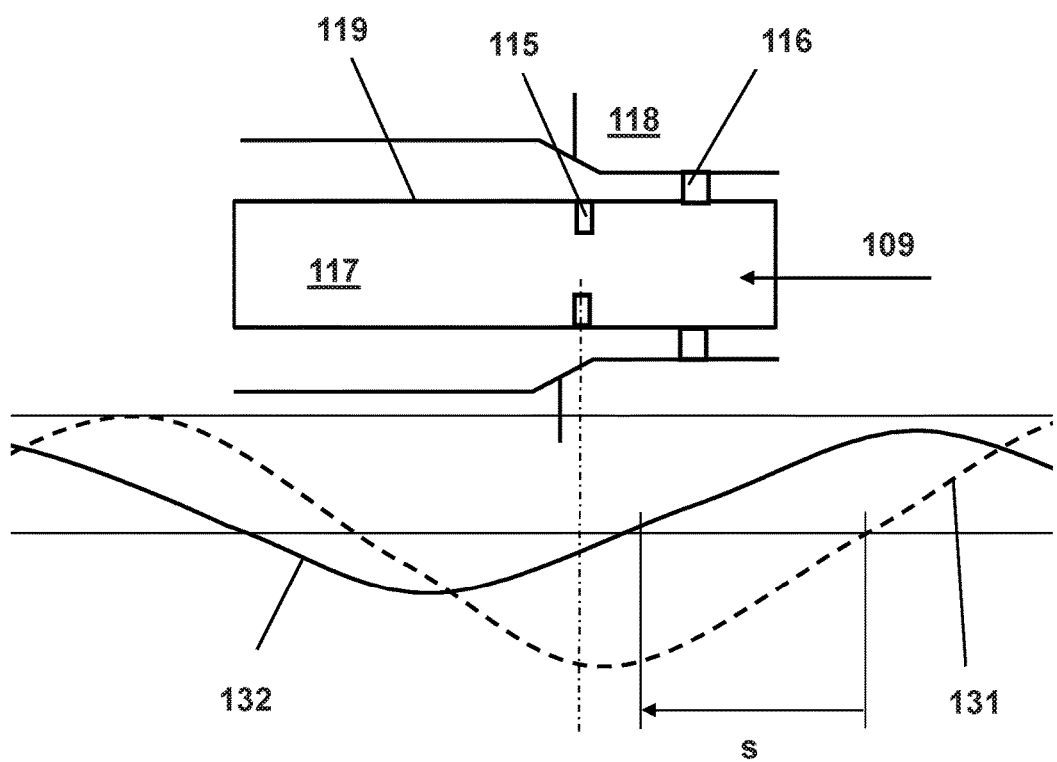
FIG. 7 shows a mixer indicating the location of a pulsation wave without damping and of the pulsation wave after shifting and dampening.

In FIG. 7 the position of a pulsation wave 131 in the hot gas flow 109 in a mixer 117 is indicated relative to the position of an injection opening 115 and a neck 116. The dotted line indicates an initial pulsation wave 131 without a damper volume 118. The solid line indicates a shifted pulsation wave 132. The shifted pulsation wave 132 is displaced by a shift of pulsation wave node s due to the effect of the damper. Due to the damping effect the amplitude of the shifted pulsation wave 132 is reduced relative to the initial pulsation wave 131. The resulting pulsations at the injection opening 115 are for example one order of magnitude smaller than without the damper.

All the explained advantages are not limited just to the specified combinations but can also be used in other combinations or alone without departing from the scope of the disclosure. Other possibilities are optionally conceivable, for example, for deactivating individual burners or groups of burners to modify the pulsation behavior of the combustor arrangement. Further, the dilution gas can be re-cooled in a cooling air cooler before admixing in the mixer. Further two or more dampers can be arranged near the injection openings 115, 115a. The dampers can be designed to dampen and shift one pulsation frequency or different dampers of a plurality of dampers can be designed to dampen and shift different pulsation frequencies.

LIST OF DESIGNATIONS

100 Gas Turbine
101 First Combustor
102 Second Combustor
103 Compressor
104 Sequential combustor arrangement
105 Turbine
106 Shaft
107 Exhaust Gas
108 Compressed Air
109 Hot gas flow
110 Dilution gas
111 Connecting Duct
112 First burner
113 Second burner
114 Purge gas feed
115 Injection tube
115a Injection nozzle
116 Neck
117 Mixer
118 Damper Volume
119 Mixer wall
120 Cooling gas
121 Duct wall
122 Dilution gas feed
123 First fuel injection
124 Second fuel injection
125 Cooling duct
126 Damper wall
127 Neck wall
128 Neck axis
129 Gap
130 Flange
131 Pulsation wave 132 Shifted pulsation wave
133 Compressor plenum
s shift of pulsation wave node
x Distance to dilution injection
D Hydraulic diameter of mixer

The invention claimed is:

1. A sequential combustor arrangement comprising:
a first burner, a first combustion chamber, a mixer for admixing a dilution gas to hotter gases leaving the first combustion chamber during operation, a second burner, and a second combustion chamber arranged sequentially in a fluid flow connection,
wherein the mixer is configured to guide combustion gases in a hot gas flow path extending between the first combustion chamber and the second burner,
wherein the mixer includes at least one injection opening for admixing the dilution gas to cool hot flue gases leaving the first combustion chamber, and
a damper for damping pressure pulsations inside the mixer having a damper wall which encloses a damper volume and a neck connecting the damper volume to the mixer;
an opening of the neck that opens to the hot gas flow path being spaced apart from the at least one injection opening such that a flow rate of the dilution gas passable into the mixer via the at least one injection opening is constant over time so that hot gas of the hot gas flow path is cooled to a predetermined temperature profile; and
a dilution gas feed connected to the at least one injection opening, wherein a ratio of a pressure loss coefficient of the dilution gas feed to a pressure loss coefficient of the at least one injection opening is smaller than a ratio of a pressure loss coefficient of a purge gas feed that is fed to the damper volume to a pressure loss coefficient of the neck.

2. The sequential combustion arrangement according to claim 1, wherein one of:
a distance in flow direction of the hot gas along the hot gas flow path between the at least one injection opening and the opening of the neck to the hot gas flow path in a mixer wall of the mixer is less than three times a hydraulic diameter of the mixer at the opening of the neck; and
a distance between the at least one injection opening and the opening of the neck to the hot gas flow path in the mixer wall is less than the hydraulic diameter of the mixer at the opening of the neck.

3. The sequential combustion arrangement according to claim 2, wherein the mixer wall of the mixer is enclosed by the damper wall forming a cooling duct for cooling the inlet section of the mixer between the upstream end of the mixer and a first injection opening of the at least one injection opening for admixing the dilution gas.

4. The sequential combustion arrangement of claim 2, wherein the distance between the at least one injection opening and the opening of the neck to the hot gas flow path in the mixer wall is less than the hydraulic diameter of the mixer at the opening of the neck.

5. The sequential combustion arrangement according to claim 3, wherein the neck extends from the damper wall through the cooling duct to the mixer wall.

6. The sequential combustion arrangement according to claim 5, wherein a duct wall at least partly encloses the mixer wall delimiting a connecting duct for feeding dilution gas to the at least one injection opening.

7. The sequential combustion arrangement according to claim 5, wherein the at least one injection opening comprises a plurality of injection openings and wherein the neck opens to the hot gas flow path between the injection openings or upstream of the injection openings in a hot gas flow direction.

8. The sequential combustion arrangement according to claim 1, wherein the purge gas feed is positioned to supply the purge gas feed as cooling air to the damper volume.

9. The sequential combustion arrangement according to claim 1, wherein the neck has a neck wall defining a neck volume inside the neck wall, wherein the neck is associated with the damper volume for fluid communication between the damper volume and the hot gas flow path in the mixer, and wherein the damper includes a gap between the neck wall and the damper wall.

10. The sequential combustion arrangement according to claim 1, wherein the neck has a neck wall defining a neck volume inside the neck wall, wherein the neck is associated with the damper volume for fluid communication between the damper volume and the hot gas flow path in the mixer, and wherein the combustor arrangement includes a gap between the neck wall and the damper wall to avoid stresses at an interface between a wall of the mixer and the neck wall.

11. The sequential combustion arrangement according to claim 1, wherein a flow capacity of a dilution gas flow path from a compressor plenum to the hot gas flow path in the mixer is at least two times larger than a flow capacity of a purge air flow path from the compressor plenum to the hot gas flow path in the mixer.

12. A gas turbine engine with at least one compressor, a combustor, and at least one turbine, wherein the gas turbine engine comprises: a sequential combustor arrangement according to claim 1.

13. A method of operation of a gas turbine comprising the sequential combustor arrangement of claim 1, the method comprising:
operating the mixer for admixing the dilution gas to hot gases leaving the first combustion chamber during operation, wherein the opening of the neck to the hot gas flow path is spaced apart from the at least one injection opening such that a distance in flow direction of the hot gas flow path between the at least one injection opening and the opening of the neck is one of: (i) less than three times a hydraulic diameter of the hot gas flow path at the opening of the neck, and (ii) is less than a hydraulic diameter of the mixer at the opening of the neck;
feeding the dilution gas into the mixer via the at least one injection opening such that a flow rate of the dilution gas passed into the mixer via the at least one injection opening is constant over time so that hot gas of the hot gas flow path is cooled to a predetermined temperature profile; and
affecting pulsation in the mixer via the damper such that a node of a pulsation wave of the pulsation is positioned adjacent the at least one injection opening by the opening of the neck of the damper, the pulsation in the mixer occurring during operation of the sequential combustor arrangement.

14. The method of operation of a gas turbine according to claim 13, wherein an average velocity of the dilution gas in the at least one injection opening is at least twice as high as a time averaged flow velocity in the neck.

15. The method of operation of a gas turbine according to claim 13, comprising:

feeding a purge gas of the purge gas feed to the damper, wherein a pressure drop over the purge gas feed connected to the neck is at least twice as large as a pressure drop over the neck.

16. A method of operation of a gas turbine comprising the sequential combustor arrangement of claim 1, the method comprising:

operating the mixer for admixing the dilution gas to hot gases leaving the first combustion chamber;

using the damper for damping pressure pulsations inside the mixer during the operating of the mixer, such that a distance in flow direction of the hot gas flow path between the at least one injection opening and the opening of the neck facilitates formation of a node of a pulsation wave of a pulsation generated in the mixer during the operating of the mixer; and feeding the dilution gas into the mixer via the at least one injection opening and performing the using of the damper so that the node of the pulsation wave is shifted toward the at least one injection opening and also has a reduced amplitude.

17. The method of claim 16, wherein the distance that spaces apart the opening of the neck from the at least one injection opening of the mixer is one of: (i) less than three times a hydraulic diameter of the hot gas flow path at the opening of the neck, (ii) is less than a hydraulic diameter of the mixer at the opening of the neck, and (iii) is less than one sixth a wave length of the pulsation wave in the mixer.

18. The method of claim 16, wherein there is a gap defined between a wall of the mixer and a wall of the neck to avoid stresses at an interface between the wall of the mixer and the neck.

\* \* \* \* \*